(12) United States Patent
Shin et al.

(10) Patent No.: US 7,228,891 B2
(45) Date of Patent: Jun. 12, 2007

(54) HEAT EXCHANGER OF VENTILATING SYSTEM

(75) Inventors: Soo-Yeon Shin, Gimhae (KR); Seong-Hwan Lee, Changwon (KR); Min-Chul Cho, Busan (KR); Sung-Hwa Lee, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/536,959

(22) PCT Filed: Dec. 2, 2002

(86) PCT No.: PCT/KR02/02265

§ 371 (c)(1),
(2), (4) Date: May 31, 2005

(87) PCT Pub. No.: WO2004/051172

PCT Pub. Date: Jun. 17, 2004

(65) Prior Publication Data

US 2006/0070728 A1    Apr. 6, 2006

(51) Int. Cl.
F28F 3/02    (2006.01)
(52) U.S. Cl. .................................. 165/166; 165/164
(58) Field of Classification Search ............... 165/164, 165/166
See application file for complete search history.

(56) References Cited

U.S. PATENT DOCUMENTS

| | | | | |
|---|---|---|---|---|
| 1,458,128 A | * | 6/1923 | Curran | 165/153 |
| 2,314,966 A | * | 3/1943 | Astle | 165/167 |
| 2,616,671 A | * | 11/1952 | Wakeman | 165/167 |
| 3,666,007 A | * | 5/1972 | Yoshino et al. | 96/144 |
| 5,031,693 A | * | 7/1991 | VanDyke | 165/166 |
| 5,531,269 A | * | 7/1996 | Dahlgren | 165/167 |
| 6,127,571 A | * | 10/2000 | Mulvaney, III | 562/98 |
| 6,145,588 A | * | 11/2000 | Martin et al. | 165/166 |
| 2002/0011331 A1 | * | 1/2002 | Lehman et al. | 165/166 |
| 2002/0185266 A1 | * | 12/2002 | Dobbs et al. | 165/166 |

FOREIGN PATENT DOCUMENTS

| GB | 1450460 A | 9/1976 |
|---|---|---|
| JP | 05-288490 A | 11/1993 |
| KR | 2000-0010461 U | 6/2000 |
| WO | WO 2001/027552 A1 | 4/2001 |

\* cited by examiner

Primary Examiner—Teresa J. Walberg
(74) Attorney, Agent, or Firm—Birch, Stewart, Kolasch & Birch, LLP

(57) ABSTRACT

A heat exchanger of a ventilating system, including a plurality of heat exchanging plates which are laminated at a predetermined interval, a first heat exchange member which is laminated among the heat exchanging plates and is formed in a mesh type to increase turbulence of the outdoor air which flows while being attached on a first air path through which outdoor air passes and a second heat exchange member which is laminated among the heat exchanging plates crossed with the first heat exchange member and is formed in a mesh type to increase turbulence of indoor air which flows while being attached on a second air path through which the outdoor air passes can improve heat transfer performance by increasing turbulence of air by positioning a mesh type heat exchange in a air path through which outdoor and indoor air passes.

11 Claims, 6 Drawing Sheets

HEAT EXCHANGER OF VENTILATING SYSTEM

TECHNICAL FIELD

The present invention relates to a ventilating system for exchanging indoor air and outdoor air and particularly, to a heat exchanger of a ventilating system, capable of improving heat exchanging performance between outdoor air and indoor air.

BACKGROUND ART

Generally, a ventilating system is a system for discharging polluted indoor air to the outdoor and sucking fresh outdoor air to the indoor, and the system includes an air cleaner for removing dust and foreign materials contained in the outdoor air, and a heat exchanger for transferring heat of the discharged indoor air to the sucked outdoor air.

FIG. 1 is a perspective view showing a conventional ventilating system.

The ventilating system includes a case 2 which is mounted on a wall for dividing indoor and outdoor, blowing fans 4 and 6 which are mounted in the case 2, for ventilating air which is sucked and discharged, an air cleaner (not shown) which is installed in a portion to which the outdoor air inside the case 2 is sucked, for cleaning the outdoor air sucked to the indoor, and a heat exchanger 8 which is positioned inside the case 2, for performing a heat exchanging operation of indoor air discharged the outdoor and outdoor air sucked to the indoor.

Here, the case 2 is disposed in a hole formed on the wall for diving the indoor and outdoor, and accordingly, one side is positioned indoors and the other side is positioned outdoors. At this time, an outdoor suction hole 10 to which outdoor air is sucked and an indoor discharging hole 12 through which indoor air is discharged to the outdoor are respectively formed on the side wall of the case 2 positioned outdoors, and an indoor discharging hole 14 through which outdoor air is discharged to the indoor and an indoor suction hole 16 through which indoor air is sucked are respectively formed on the side wall of the case 2 positioned indoors.

The blowing fans 4 and 6 includes a discharging blowing fan 4 which is installed in a position connected with the outdoor discharging hole 12, for providing a blowing pressure for discharging the indoor air to the outdoor, and a suction blowing fan 6 which is installed in a position connected with the indoor discharging hole 14, for providing a blowing pressure for sucking the outdoor air to the indoor.

FIG. 2 is a perspective view showing a conventional heat exchanger of a ventilating system, and FIG. 3 is a partial perspective view showing the conventional heat exchanger of a ventilating system.

The conventional heat exchanger 8 includes a plurality of base plates 20 which are laminated at a regular interval in a shape of a thin plate, first corrugation plates 22 which are respectively laminated in the spaces among the base plates 20, through which indoor air passes, and second corrugation plates 24 which are respectively laminated in the base plates 20 to be mutually crossed with the first corrugation plates 22 in turn, through which outdoor air passes.

Here, the first and second corrugation plates 22 and 24 are curved in a triangular shape, and indoor and outdoor air passes to the inner and outer sides thereof, thus to mutually exchange heat.

Such heat exchanger 8 is formed in a rectangular shape by sequentially laminating the first corrugation plates 22, base plates 20, and second corrugation plates 24. The upper and lower surfaces of the heat exchanger 8 are respectively closed by the base plate 20, and the both side surfaces of the heat exchanger are connected with the outdoor suction hole 10 and indoor discharging hole 14, and outdoor air passes therethrough. Another both side surfaces of the heat exchanger are respectively connected with the outdoor discharging hole 12 and indoor suction hole 16, and indoor air passes therethrough.

That is, as the outdoor air which passes the first corrugation plates 22 and indoor air which passes the second corrugation plates 24 pass while being crossed with each other, heat exchange is performed by transferring heat of the indoor air through the base plates 20.

The operation of the conventional heat exchanger for the ventilating system with the above structure will be described as follows.

When the sucking blowing fan 6 is driven, the outdoor air is sucked to the outdoor suction port 10 and is supplied to the indoor through the indoor discharging hole 14 by passing the first corrugation plate 22. When the discharging blowing fan 4 is driven, the indoor air is sucked through the indoor suction hole 16 and discharged to the indoor through the outdoor discharging hole 12 by passing the second corrugation plate 24.

Here, as the outdoor air passing in the first corrugation plate 22 and indoor air passing the second corrugation plate 24 flow while being crossed with each other, heat in the indoor air is transferred to the outdoor air through the base plate 20, and the outdoor air which sucked the heat of the indoor air is supplied to the indoor.

As described above, since heat in the discharged indoor air is sucked to the outdoor air and discharged to the indoor, rapid temperature change of the indoor air can be prevented in case of operating ventilation.

However, in the conventional heat exchanger of the ventilating system, the first and second corrugation plates 22 and 24 are formed in a shape of a plate having a corrugation of a predetermined shape, and a boundary layer S is developed as the air flowing in the first and second corrugation plates moves along from the inlet side to the outlet side. Therefore, heat transfer efficiency is degraded and indoor temperature is rapidly changed in case of ventilating since the outdoor air sucked to the indoor could not absorb heat in the indoor air. Also, energy consumption for recovering the indoor air is increased and indoor air conditioning performance is degraded.

That is, as shown in FIG. 4, particles of viscous air which flow inside a pipe of the first and second corrugation plates 22 and 24 stick on the surface contacted on a surface of the inside of the pipe when the viscous air flows on the surface of the inside of the pipe. As the air gets apart from the surface of the inside of the pipe, the air recovers the speed and gains a speed of a free flow in a position at a predetermined distance from the surface of the solid material. At this time, as the air is get apart from the surface of the inside of the pipe, a boundary layer S is formed.

As described above, as the air flowing on the surface of the inside of the pipe is processed, the boundary layer is developed and the air gets apart from the surface of the inside of the pipe, thus to degrade heat transfer efficiency that the heat of the indoor air is transferred to the outdoor air through the base plate 20.

DISCLOSURE OF THE INVENTION

Therefore, an object of the present invention is to provide a heat exchanger of a ventilating system, capable of improving heat transfer performance by increasing turbulence of air passing through an air path by positioning a mesh type air path through which outdoor and indoor air passes.

To achieve these and other advantages and in accordance with the purpose of the present invention, as embodied and broadly described herein, there is provided a heat exchanger of a ventilating system, including a plurality of heat exchanging plates which are laminated at a predetermined interval, a first heat exchange member which is laminated among the heat exchanging plates and is formed in a mesh type to increase turbulence of the outdoor air which flows while being attached on a first air path through which outdoor air passes and a second heat exchange member which is laminated among the heat exchanging plates while being crossed with the first heat exchange member and is formed in a mesh type to increase turbulence of indoor air which flows while being attached on a second air path through which the indoor air passes.

The heat exchanging plate is formed with an aluminum plate or paper materials.

The first and second heat exchange members are positioned in a corrugated shape to secure the first and second air paths among the heat exchanging plates, and is formed with an aluminum material of the mesh type so that the outdoor and indoor air flowed to the first and second air paths can pass from the upper surface to the lower surface of the heat exchange members, or from the lower surface to the upper surface.

The first and second heat exchange members are positioned just a predetermined angle slanted from the direction that the air flows.

The first and second heat exchange members are positioned 30°~60° slanted from the direction that the air flows.

The first and second heat exchange members are positioned in a corrugated shape to secure the first and second air paths among the heat exchanging plates, and is formed in a plate type that a plurality of through holes are formed therein, so that the outdoor and indoor air flowed to the first and second air paths can pass from the upper surface to the lower surface of the heat exchange members, or from the lower surface to the upper surface.

The first and second heat exchange members are formed with aluminum or paper materials.

The first and second heat exchange members are formed with a porous resin film.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

Reference will now be made in detail to the preferred embodiments of the present invention, examples of which are illustrated in the accompanying drawings.

As the embodiment of the heat exchanger of the ventilating system in accordance with the present invention, there can be a plurality of them, and hereinafter, the most preferable one will be described.

Figure 5:
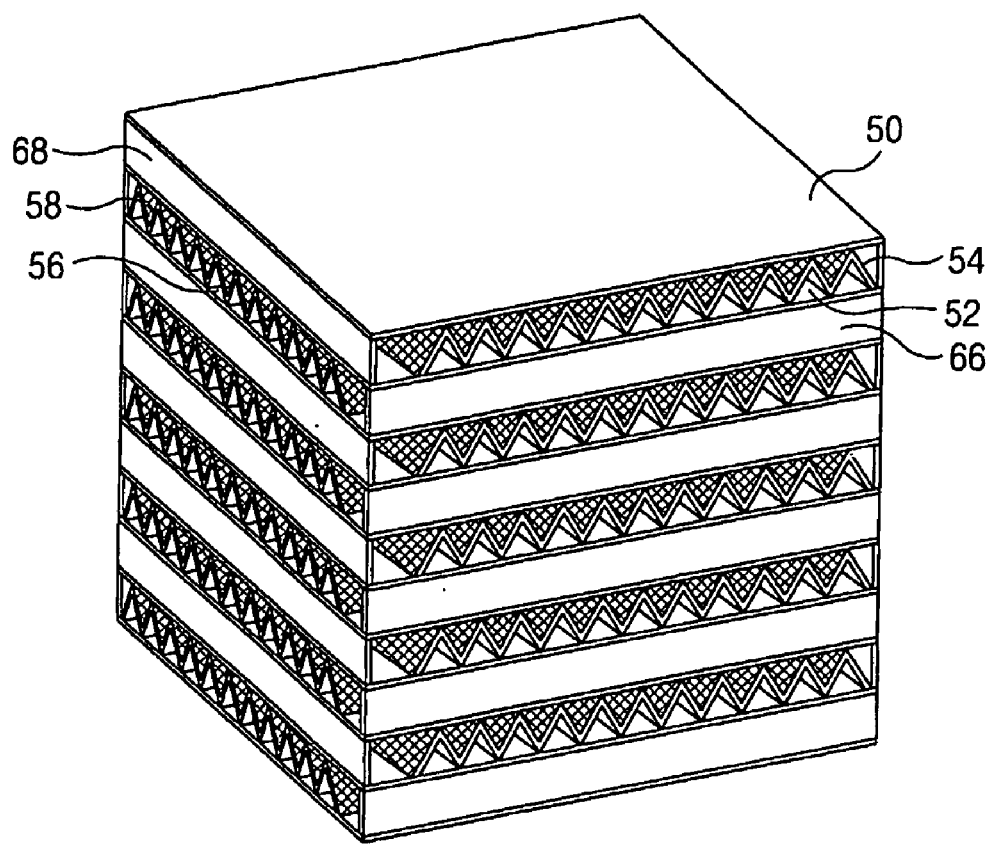
FIG. 5 is a partial perspective view showing a heat exchanger of a ventilating system in accordance with the present invention.

FIG. 5 is a perspective view showing a heat exchanger of a ventilating system in accordance with the present invention.

Figure 1:
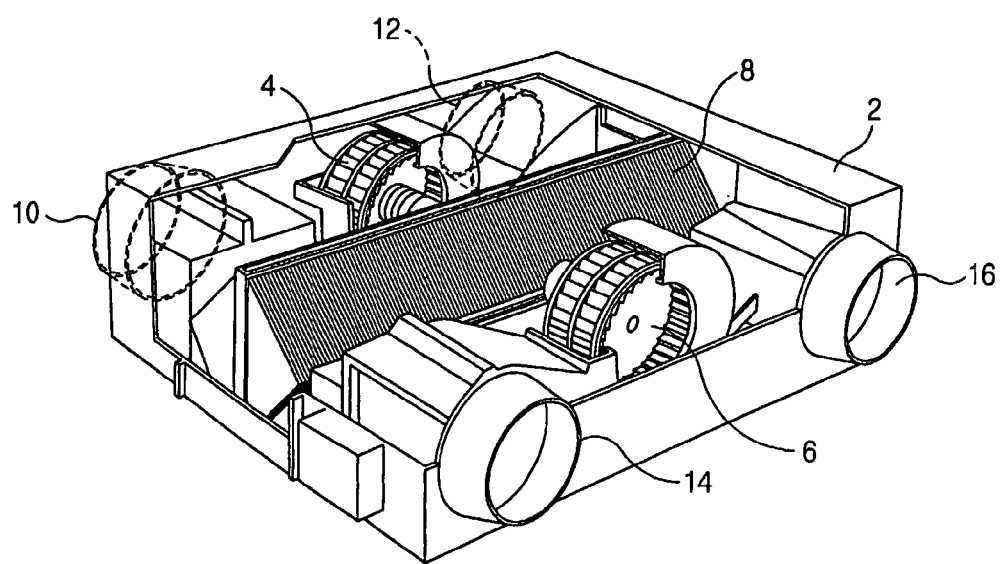
FIG. 1 is a partially cut perspective view showing the structure of a general ventilating system.
Figure 2:
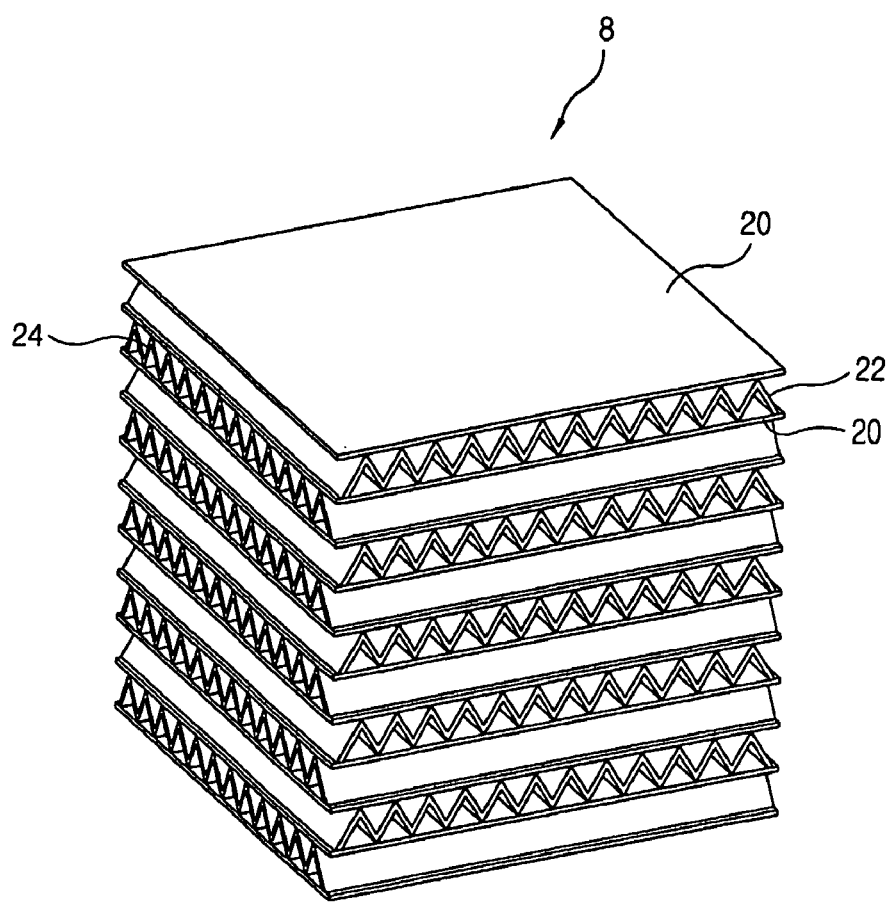
FIG. 2 is a partial perspective view showing a conventional heat exchanger of a ventilating system.
Figure 3:
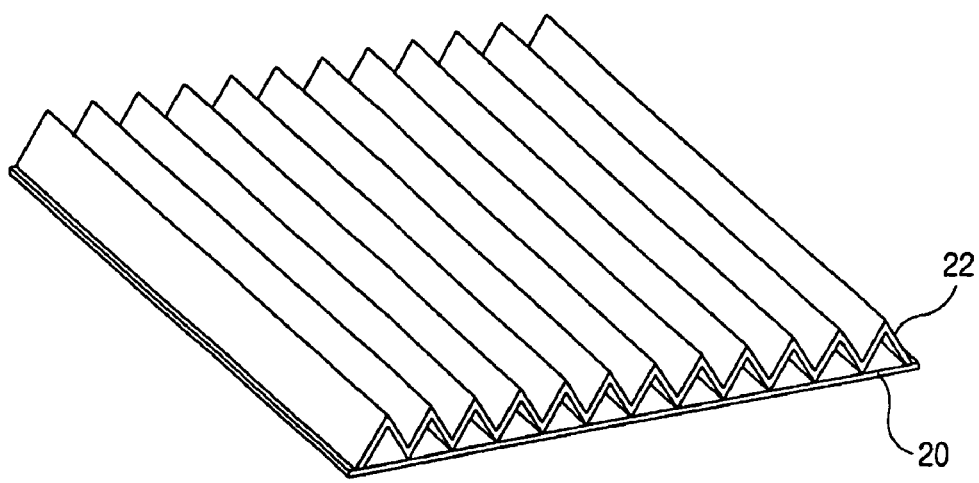
FIG. 3 is a perspective view showing a conventional corrugation plate of the heat exchanger of a ventilating system.
Figure 4:
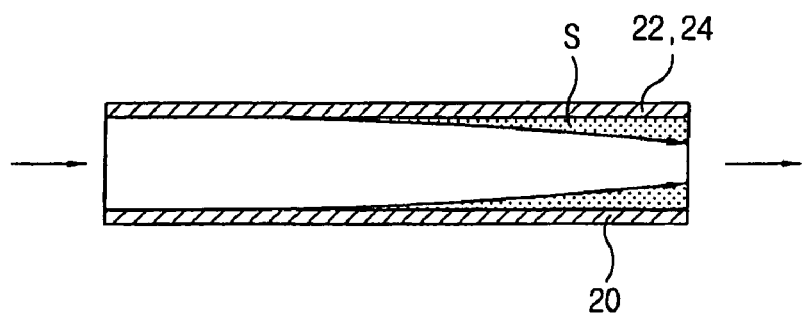
FIG. 4 is a cross-sectional view showing a movement of the air in the pipe to which the conventional heat exchanger of a ventilating system is applied.

With reference to FIG. 1, in the ventilating system in accordance with the present invention, a case 2 is mounted to penetrate a wall which divides the indoor and outdoor, a side surface of the case 2 is positioned outdoors and the other side surface is positioned indoors. Here, an outdoor suction hole 10 through which the outdoor air is sucked and an outdoor discharging hole 12 through which the indoor air is discharged are respectively formed on a side surface positioned at the outdoor of the case 2, and an indoor discharging hole 14 through which the outdoor air is discharged to the indoor and an indoor suction hole 16 through which the indoor air is sucked are respectively formed on a side surface positioned at the indoor of the case 2.

A discharging blowing fan 4 for giving a blowing pressure for discharging the indoor air to the outdoor is installed in a position connected with the outdoor discharging hole 12 inside the case 2, and a suction blowing fan 6 for giving a blowing pressure for sucking the outdoor air to the indoor is installed in a position connected with the indoor discharging hole 14 inside the case 2.

An air cleaner (not shown) for removing foreign materials, dust and the like contained in the outdoor air is installed on the suction channel inside the case 2, and a heat exchanger 8 for transferring heat of the discharged indoor air to the sucked indoor air is installed inside the case 2.

As shown in FIG. 5, the heat exchanger 8 includes a heat exchange plates 50 which are laminated in a thin plate shape at a predetermined interval, a first heat exchange member 54 which is laminated among the heat exchange plates 50 and has a mesh structure to prevent development of a boundary layer in case the outdoor air flows being attached on the first air path 52 through which the outdoor air passes, and a second heat exchange member 58 which is laminated among the heat exchange plates 50 to be crossed with the first heat exchange member 54 and has a mesh structure to prevent development of a boundary layer in case the indoor air flows being attached on the second air path 56 through which the indoor air passes.

First partitions 66 for preventing inflow of indoor air to the first air path 52 are attached on the both side surfaces of the heat exchanger 8 through which the outdoor air passes and second partitions 68 for preventing inflow of outdoor air to the second air path 56 are attached on the other both side surfaces of the heat exchanger 8 through which the outdoor air passes.

It is desirable that the heat exchange plate 50 is made of materials having an excellent heat exchange efficiency, and as an embodiment of the plate, it can be formed with a thin aluminum plate or paper materials.

The first and second heat exchange member 54 and 58 are formed in a same shape, are installed to be crossed with each other according to the direction that the air flows, and are laminated in turn.

Figure 6:
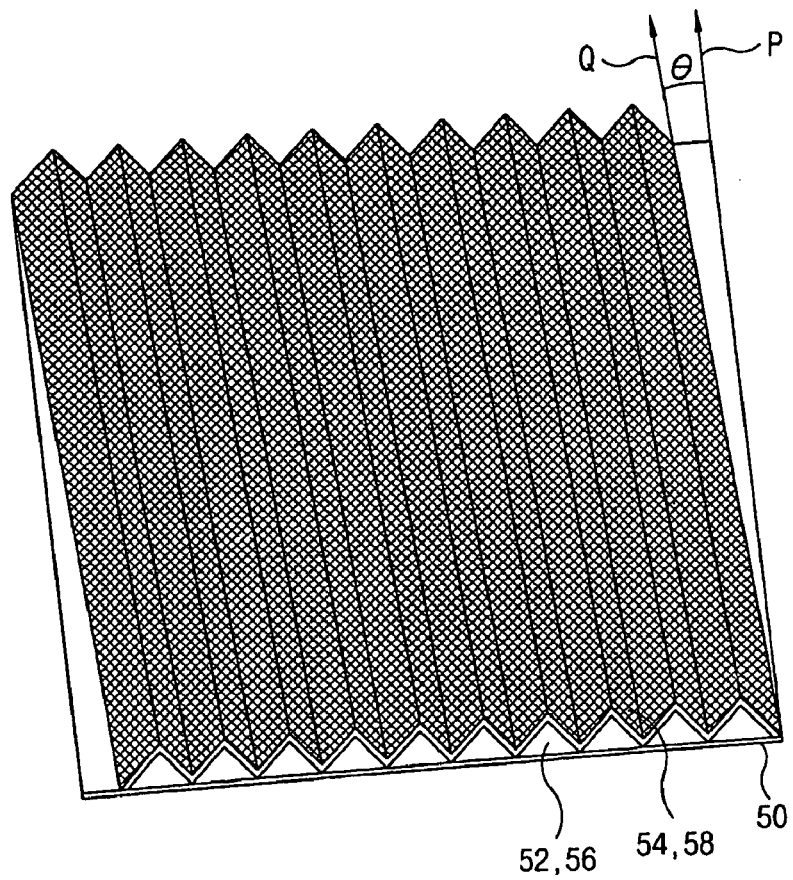
FIG. 6 is a partial perspective view showing a heat exchange member of the heat exchanger of a ventilating system in accordance with an embodiment of the present invention.

As shown in FIG. 6, such first and second heat exchange members 54 and 58 are positioned in a corrugated shape to secure the first and second air paths 52 and 56 among the heat exchange plates 50, and it is desirable that the members are formed with aluminum materials of a mesh type so that the outdoor and indoor air flowed to the first and second air paths 52 and 56 can pass from the upper surface to the lower surface of the heat exchange members 54 and 58, or from the lower surface to the upper surface.

The heat exchange members 54 and 58 are formed a predetermined angle slanted from the direction that air flows. That is, the heat exchange members 54 and 58 are positioned an angle θ slanted from the P direction that the air flows, and increase turbulence of the air passing from the upper surface to the lower surface of the heat exchange members 54 and 58, or from the lower surface to the upper surface of the heat exchange members 54 and 58, thus to increase heat transfer efficiency.

Here, it is desirable that the angle θ that the heat exchange member is positioned from the direction that the air flows is about 30°~60°.

The operation of the heat exchanger in accordance with the present invention will be described as follows.

When the suction blowing fan 6 is driven, the outdoor air is sucked through the outdoor suction hole 10, various dusts and foreign materials are removed by passing the air cleaner, and the outdoor air is supplied to the indoor through the indoor discharging hole 14 by passing the first air path 52. When the discharging blowing fan 4 is driven, the indoor air is sucked through the indoor suction hole 16, and discharged to the outdoor through the outdoor discharging hole 12 by passing the second air path 56.

Here, as the indoor air passing the first air path 52 and outdoor air passing the second air path 56 flow while being crossed with each other, heat contained in the indoor air is sucked to the outdoor air through the heat exchange plate 50, and the outdoor air which was completely heat exchanged is supplied to the indoor.

When describing the operation of the heat exchanger 8 in more detail, as the indoor and outdoor air flowed to the first and second air paths 52 and 56 passes from the upper surface to the lower surface of the heat exchange members 54 and 58, or from the lower surface to the upper surface, the air turbulence of the air is increased, thus to improve heat transfer performance by preventing development of the boundary layer.

Figure 7:
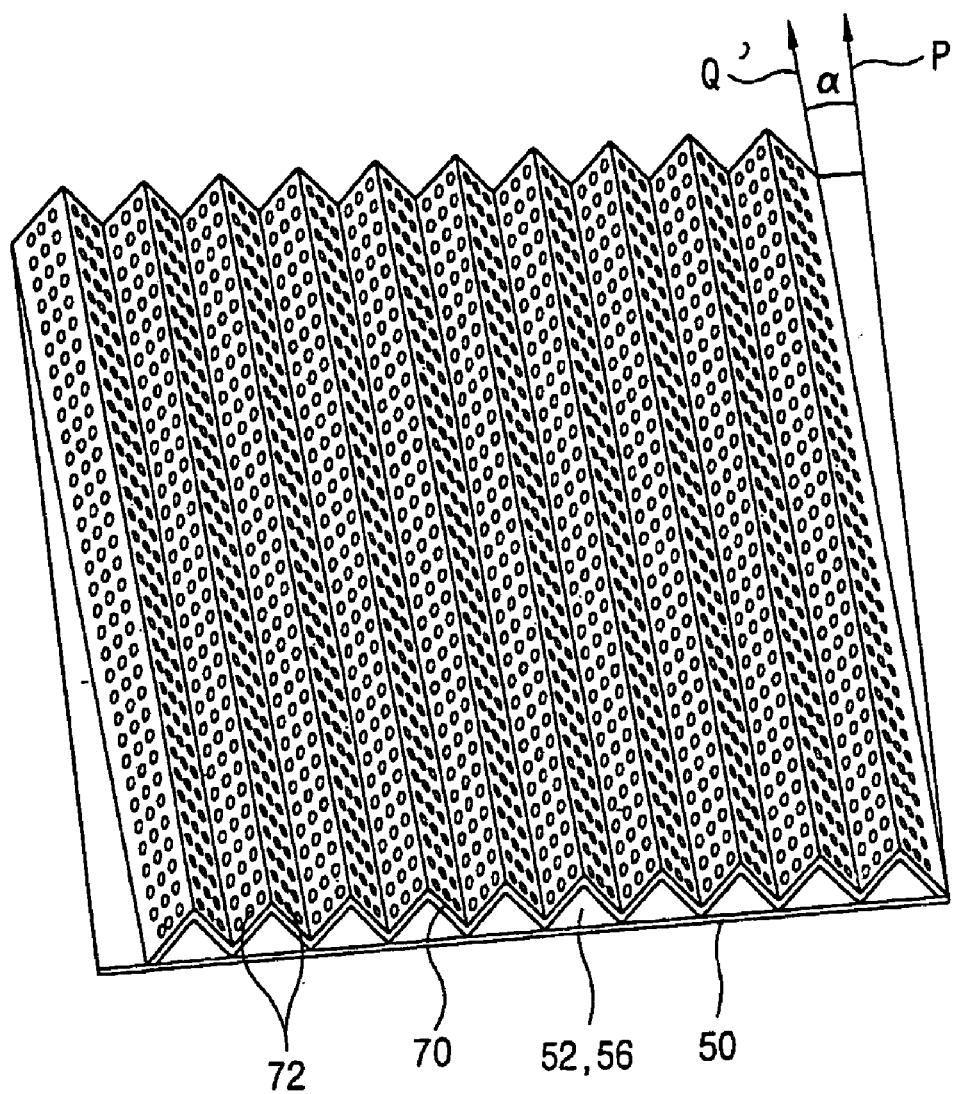
FIG. 7 is a partial perspective view showing a heat exchange member of the heat exchanger of a ventilating system in accordance with a second embodiment of the present invention.

FIG. 7 is a partial perspective view showing the structure of the heat exchanger in accordance with the second embodiment of the present invention.

The heat exchanger in accordance with the second embodiment is formed in a structure as a heat exchanger 8 described in the above embodiment, and formed in a plate type having a plurality of through holes 72.

That is, the heat exchange member 70 in accordance with the second embodiment is formed in a corrugated plate shape at a predetermined angle with which a plurality of through holes 72 through which air can pass are formed.

Here, the heat exchange member 70 is manufactured by punching a plurality of through holes on metal materials such as aluminum and the like, or paper materials. The heat exchange member can be formed with a porous resin film. The angle a that the heat exchange member is positioned is formed to be 30°~60° slanted from the direction that the air flows as in the above embodiment.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

INDUSTRIAL APPLICABILITY

In the heat exchanger in accordance with the present invention with the above structure and operation, the heat exchange member has a mesh structure in which a plurality of holes are formed and is positioned a predetermined angle slanted from the direction that the air flows. Accordingly, as the air passing through the first and second air paths flows from the upper surface to the lower surface of the heat exchange member, or from the lower surface to the upper surface, turbulence is generated in the flowing air, and development of the boundary layer can be restricted, thus to improve heat transfer performance.

In addition, by the above structure, as the heat transfer performance is improved, energy consumption can be reduced since change of the indoor air is small, and more comfortable indoor environment can be made by uniformly maintaining indoor temperature.

The invention claimed is:

1. A heat exchanger of a ventilating system, comprising:
    a plurality of heat exchanging plates being laminated at a predetermined interval, each of the heat exchanging plates preventing airflow therethrough;
    a first heat exchange member being laminated among the heat exchanging plates, the first heat exchange member having a folded corrugated shape including a first plurality of upper bends, a first plurality of lower bends, a first plurality of wall portions connecting adjacent first upper bends and first lower bends, each first wall portion having a plurality of through holes arranged in both a longitudinal direction and a transverse direction therein, each of the first plurality of upper and lower bends extending substantially in the direction of the airflow, and the first heat exchange member being formed to increase turbulence of the outdoor air which flows while being attached on a first air path through which outdoor air passes; and
    a second heat exchange member which is laminated among the heat exchanging plates crossed with the first heat exchange member, the second heat exchange member having a folded corrugated shape including a second plurality of upper bends, a second plurality of lower bends, a second plurality of wall portions connecting adjacent second upper bends and second lower bends, each second wall portion having a plurality of through holes arranged in both a longitudinal direction and a transverse direction therein, each of the second plurality of upper and lower bends extending substantially in the direction of the airflow, and the second heat exchange member being formed to increase turbulence of indoor air which flows while being attached on a second air path through which the indoor air passes.

2. The exchanger of claim 1, wherein the heat plates are formed with an aluminum plate or paper materials.

3. The exchanger of claim 1, wherein the first and second heat exchange members are positioned to secure the first and second air paths among the heat exchanging plates, and each is formed with an aluminum material of the mesh type so that the outdoor and indoor air flowed to the first and second air paths can pass from the upper surface to the lower surface of the heat exchange members, or from the lower surface to the upper surface.

4. The exchanger of claim 3, wherein the first and second heat exchange members are positioned at a predetermined angle slanted from the direction that the air flows.

5. The exchanger of claim 4, wherein the first and second heat exchange members are positioned 30°–60° slanted from the direction that the air flows.

6. The exchanger of claim 1, wherein the first and second heat exchange members are positioned to secure the first and second air paths among the heat exchanging plates, and each is formed in a plate type, so that the outdoor and indoor air flowed to the first and second air paths can pass from the upper surface to the lower surface of the heat exchange members, or from the lower surface to the upper surface.

7. The exchanger of claim 6, wherein the first and second heat exchange members are formed with aluminum or paper materials.

8. The exchanger of claim 6, wherein the first and second heat exchange members are formed with a porous resin film.

9. The exchanger of claim 6, wherein the first and second heat exchange members are positioned at a predetermined angle slanted from the direction that the air flows.

10. The exchanger of claim 6, wherein the first and second heat exchange members are positioned 30°–60° slanted from the direction that the air flows.

11. The exchanger of claim 6, wherein the first plurality of through holes of each first wall portion are arranged in three rows extending along the longitudinal direction of the first wall portion and the second plurality of through holes of each second wall portion are arranged in three rows extending along the longitudinal direction of the second wall portion.

* * * * *